United States Patent [19]
Fang et al.

[11] Patent Number: 5,598,354
[45] Date of Patent: Jan. 28, 1997

[54] MOTION VIDEO COMPRESSION SYSTEM WITH NEURAL NETWORK HAVING WINNER-TAKE-ALL FUNCTION

[75] Inventors: Wai-Chi Fang, San Marino; Bing J. Sheu, Los Angeles, both of Calif.

[73] Assignee: California Institute of Technology, Pasadena, Calif.

[21] Appl. No.: 357,578

[22] Filed: Dec. 16, 1994

[51] Int. Cl.⁶ ........................................... G06F 17/00
[52] U.S. Cl. ...................................... 364/514 R
[58] Field of Search ................ 364/514 R, 715.02;
345/202; 348/404, 409, 416; 358/426; 382/232,
244, 248, 250, 225, 239, 156, 159; 341/78;
395/20, 21, 24

[56] References Cited

U.S. PATENT DOCUMENTS

| | | | |
|---|---|---|---|
| 5,134,396 | 7/1992 | Sirat et al. | 341/78 |
| 5,253,078 | 10/1993 | Balkonski | 382/250 |
| 5,268,684 | 12/1993 | Allen et al. | 341/78 |
| 5,377,305 | 12/1994 | Russo | 395/21 |
| 5,438,293 | 8/1995 | Guerrieri et al. | 395/24 |
| 5,495,244 | 2/1996 | Jeong et al. | 348/404 |
| 5,497,153 | 3/1996 | Jeong et al. | 348/404 |

Primary Examiner—Ellis B. Ramirez
Attorney, Agent, or Firm—Michaelson & Wallace

[57] ABSTRACT

A motion video data system includes a compression system, including an image compressor, an image decompressor correlative to the image compressor having an input connected to an output of the image compressor, a feedback summing node having one input connected to an output of the image decompressor, a picture memory having an input connected to an output of the feedback summing node, apparatus for comparing an image stored in the picture memory with a received input image and deducing therefrom pixels having differences between the stored image and the received image and for retrieving from the picture memory a partial image including the pixels only and applying the partial image to another input of the feedback summing node, whereby to produce at the output of the feedback summing node an updated decompressed image, a subtraction node having one input connected to received the received image and another input connected to receive the partial image so as to generate a difference image, the image compressor having an input connected to receive the difference image whereby to produce a compressed difference image at the output of the image compressor.

28 Claims, 8 Drawing Sheets

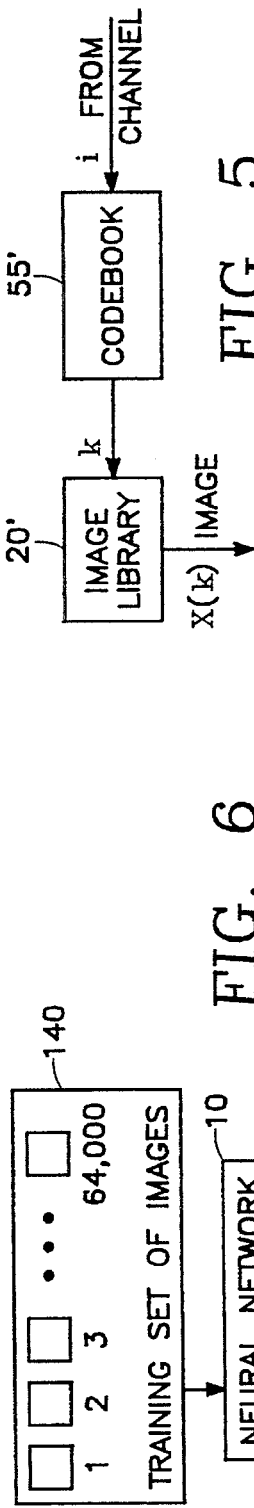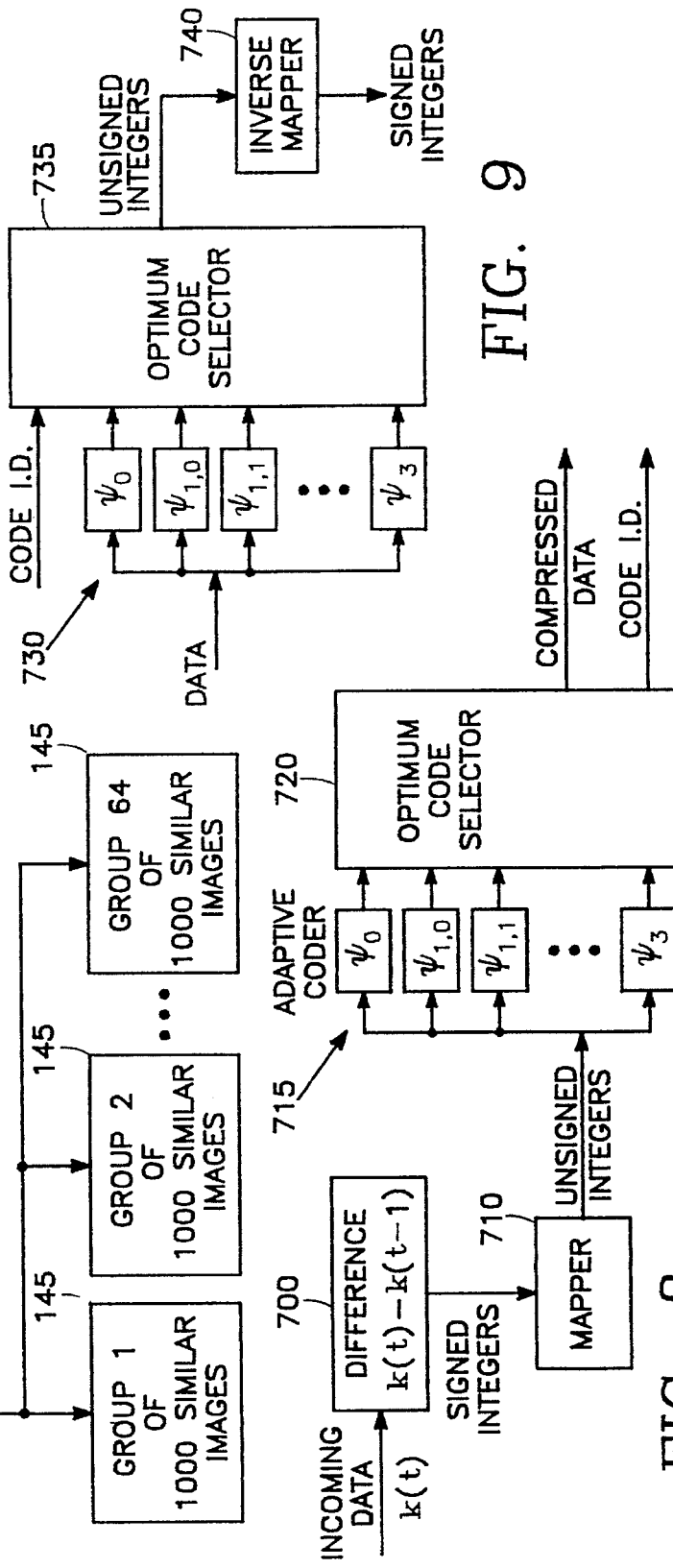

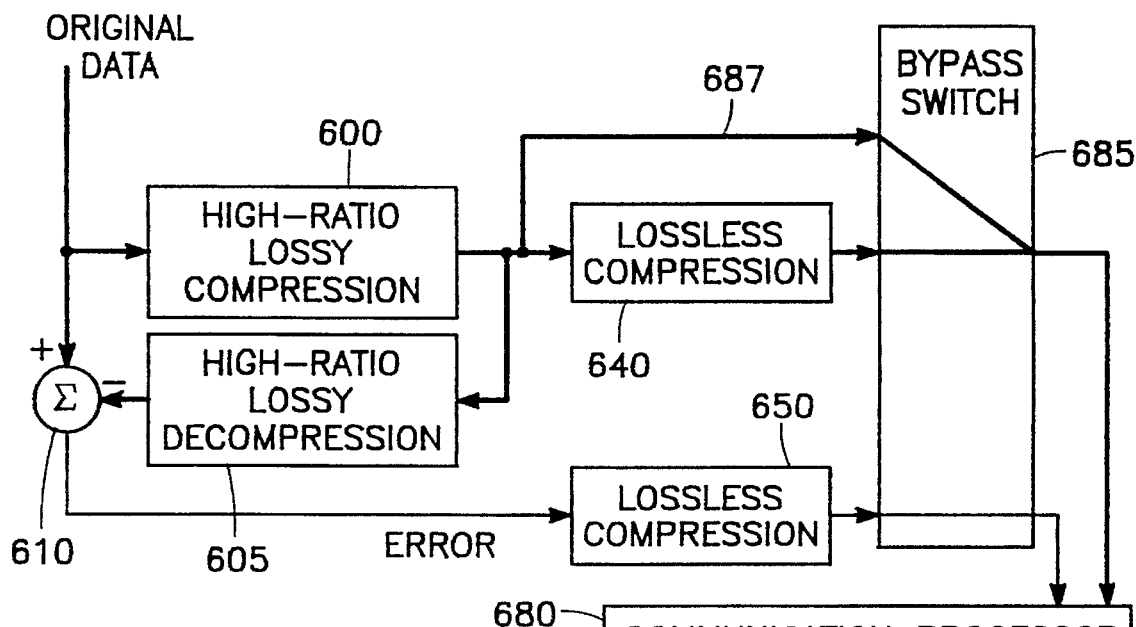
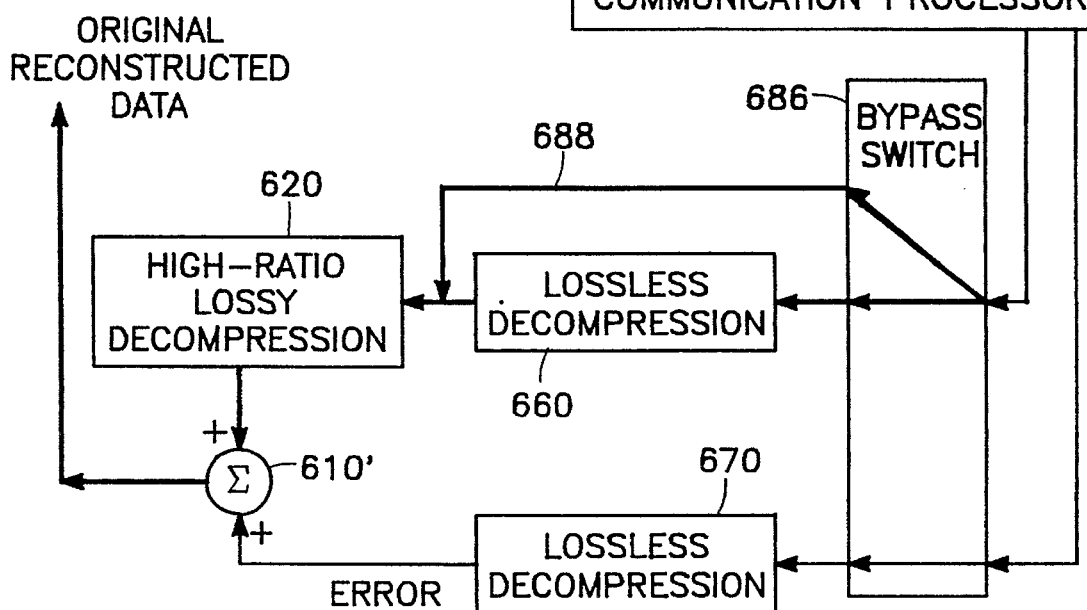
FIG. 7

MOTION VIDEO COMPRESSION SYSTEM WITH NEURAL NETWORK HAVING WINNER-TAKE-ALL FUNCTION

ORIGIN OF THE INVENTION

The invention described herein was made in the performance of work under a NASA contract, and is subject to the provisions of Public Law 96-517 (35 USC 202) in which the Contractor has elected to retain title.

BACKGROUND OF THE INVENTION

1. Technical Field

The invention is related to image compression devices and in particular to an image compression device for motion video images employing a neural network.

2. Background Art

The amount of digital data required to represent a high-quality video image is so great that it must be compressed in order to be transmitted over a data channel within a reasonable amount of time. A typical image compression device performs a discrete cosine transform on successive blocks of an image and then encodes the transformed data in accordance with a minimum redundancy code such as a Huffman code. A lossless compression device currently used to obtain high-quality images from spacecraft employs an adaptive code algorithm first described in R. F. Rice, "Some Practical Universal Noiseless Coding Techniques", JPL Publication 91-3, Jet Propulsion Laboratory, Pasadena, California, Nov. 15, 1991 and R. F. Rice et al., "On the Optimality of Code Options for a Universal Noiseless Coder", JPL Publication 91-2, Jet Propulsion Laboratory, Pasadena, Calif., 1991.

In many image compression applications, lossless compression is not necessary. In such applications, all possible images can be classified into a limited number (e.g., sixty-four) of basic distinguishable groups of similar images, each group represented by a single basic image. In this case, performing lossless compression on the image data wastes resources in both processing time and transmission time.

Another problem is that the imaging system may be re-directed to a different scene, for example, so that new image data is acquired which is no longer classifiable into the original set of groups of similar images. Thus, there is a need for a compression device which is adaptive to changes in the nature of the incoming image data.

SUMMARY OF THE INVENTION

A motion video data system includes a compression system, including an image compressor, an image decompressor correlative to the image compressor having an input connected to an output of the image compressor, a feedback summing node having one input connected to an output of the image decompressor, a picture memory having an input connected to an output of the feedback summing node, apparatus for comparing an image stored in the picture memory with a received input image and deducing therefrom pixels having differences between the stored image and the received image and for retrieving from the picture memory a partial image including the pixels only and applying the partial image to another input of the feedback summing node, whereby to produce at the output of the feedback summing node an updated decompressed image, a subtraction node having one input connected to received the received image and another input connected to receive the partial image so as to generate a difference image, the image compressor having an input connected to receive the difference image whereby to produce a compressed difference image at the output of the image compressor.

BRIEF DESCRIPTION OF THE DRAWINGS

FIG. 5 is a schematic block diagram of a high-ratio lossy image de-compressor for an image de-compression device used with the compressor of FIG. 2.

FIG. 6 is a block diagram illustrating the classifying function of the image compressor of FIG. 2.

FIG. 7 is a schematic block diagram of an image communication system having an image compression device including the lossy image compressor of FIG. 2, a data communication channel and an image de-compression device.

FIG. 8 is a simplified schematic block diagram of a lossless image compressor employed in the image compression device of FIG. 5.

FIG. 9 is a simplified schematic block diagram of a lossless image de-compressor employed in the image de-compression device of FIG. 5.

DETAILED DESCRIPTION OF THE PREFERRED EMBODIMENTS

Figure 1:
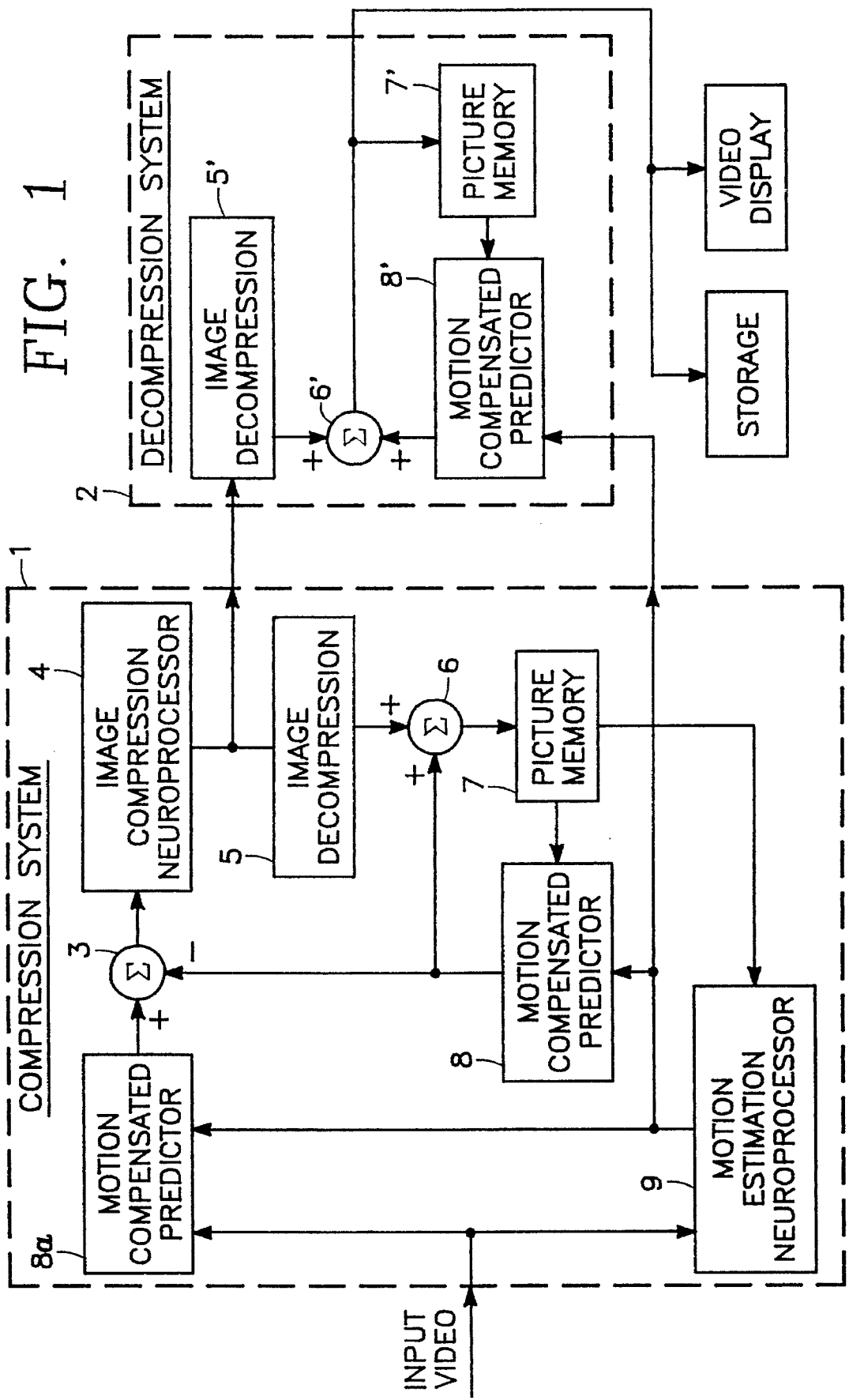
FIG. 1 is a schematic block diagram of a motion compensated predictive video compression system of a preferred embodiment of the invention.

Referring to FIG. 1, an image compression system 1 compresses and transmits an input motion video image via a channel to an image decompression system 2 which decompresses the received compressed image for display or storage.

In the compression system 1, the input motion video image is applied to the positive input of an input summing node 3 whose output is connected to the input of an image compression neuroprocessor 4. The output of the compression neuroprocessor 4 is transmitted on the channel to the decompression system 2 as well as being applied to the input of an image decompression device 5. The output of the image decompression device 5 is applied to a positive input of a feedback summing node 6. The output of the summing node 6 is stored in a frame buffer or picture memory 7 whose output is applied to the input of a motion-compensated predictor 8. The output of the motion-compensated predictor 8 is applied to a negative input of the summing node 3 and to a positive input of the summing node 6. A similar motion-compensated predictor 8a is interposed between the input motion video image and the summing node 3. Each one of the motion-compensated predictors 8, 8a passes to its output only those pixels of a video frame received at its input representing moving objects, based upon information received from a motion estimation neuroprocessor 9. The motion estimation neuroprocessor 9 controls both motion-compensated predictors 8, 8a and has one input 9a receiving all pixels of each successive frame of the input motion video image and another input 9b receiving the image stored in the picture memory 7.

Each successive video frame of the input motion video image is temporarily stored in the picture memory 7 and is available for comparison purposes upon receipt of the next video frame of the input motion video image. The motion estimation neuroprocessor 9 compares the prior video frame currently stored in the picture memory 7 with the current video frame of the input motion video image and deduces from this comparison which pixels in the current frame represent moving objects. The motion estimation neuroprocessor 9 then causes the motion-compensated predictor 8 to transmit to the negative input of the input summing node 3 a special image consisting of only those pixel locations of the previous video frame in the picture memory 7 corresponding to the moving objects detected in the current video frame. Simultaneously, the motion estimation neuroprocessor causes the motion-compensated predictor 8a to transmit to the positive input of the summing node 3 only those same pixels of the current video frame of the incoming motion video image representing moving objects. As will be described below, the output of the motion estimation neuroprocessor 9 is, in essence, a list of pixel locations corresponding to moving objects. This list of pixel locations for each frame is transmitted via the channel to the decompression system 2 along with the compressed difference image produced by the compression neuroprocesor 4.

As a result of the motion-compensated predictors 8, 8a suppressing pixel locations not containing moving objects, the summing node 3 transmits to the compression neuroprocessor 4 only differences between successive video frames. The compression neuroprocessor 4 compresses these differences and transmits the compressed difference image via the channel to the decompression system 2 as well as to the image decompressor 5. This feature greatly limits the amount of information which the neuroprocessor must compress and transmit, a significant advantage.

The image decompressor 5 reconstructs an uncompressed difference image and applies this to a positive input 6a of the feedback summing node 6. Simultaneously, the motion-compensated predictor 9 transmits the moving object pixels of the previous video frame to the other positive input 6b of the feedback summing node 6 which are the same pixels applied to the negative input of the input summing node 3 at this time. The pixels applied to the input 6b constitute an image of only moving pixels from the previous video frame while the pixels applied to the input 6a constitute a difference image which, when added, transforms or updates the moving pixel image of the previous video frame into the moving pixel image of the current video frame. It is this updated moving pixel image which is then stored in the picture memory 7. Since the moving pixel image contains no "stationary" pixels for which there is no frame-to-frame change, pixels in the picture memory 7 corresponding to such stationary pixels remain unchanged when the contents of the picture memory 7 is thus updated from the output of the feedback summing node 6.

As mentioned above, the amount of information or data which the neuroprocessor must compress and transmit on the channel is greatly limited by restricting it to differences between successive video frames. The advantage is that with less data per video frame the transmission is faster, or alternatively for a given video frame transmission time, a higher resolution image (higher number of pixels) may be transmitted. Another advantage of the invention is that any distortion inherent in the image compression process performed by the compression neuroprocessor is automatically compensated. This is because what is subtracted from the input video image by the summing node 3 is a reconstructed image containing all artifacts or distortions of the compression/decompression process. Thus, any differences resulting from such distortions would be realized at the output of the summing node 3 and would be included in the transmitted compressed difference signal to offset distortion in the compression/decompression process.

The decompression system 2 of FIG. 1 includes an image decompressor 5' a feedback summing node 6', a picture memory 7' and a motion-compensated predictor 8', identical, respectively, to the image decompressor 5, the feedback summing node 6, the picture memory 7 and the motion-compensated predictor 8 of the compression system 1. The list of pixel locations of moving objects transmitted for each video frame by the motion estimation neuroprocessor 9 controls the motion-compensated predictor 8' of the decompression system 2 in the same manner as the motion-compensated predictor 8 of the compression system 1 described above. The image decompressor 5' reconstructs an uncompressed difference image from the compressed difference image received via the channel and applies this uncompressed difference image to a positive input 6'a of the feedback summing node 6'. Simultaneously, the motion-compensated predictor 9 transmits via the channel the list of moving object pixels of the previous video frame to the other positive input 6'b of the feedback summing node 6'. The pixels applied to the input 6'b constitute an image of only moving pixels from the previous video frame while the pixels applied to the input 6'a constitute a difference image which, when added, transforms or updates the moving pixel image of the previous video frame into the moving pixel image of the current video frame. It is this updated moving pixel image which is then stored in the picture memory 7'. Since the moving pixel image contains no "stationary" pixels for which there is no frame-to-frame change, pixels in the picture memory 7' corresponding to such stationary pixels remain unchanged when the contents of the picture memory 7' is thus updated from the output of the feedback summing node 6'. The updated moving pixel image thus constructed is not only stored in the picture memory 7' for processing with the next video frame but is also furnished to a video display or storage device as the reconstructed video image.

Each of the components of the compression system 1 will now be described in detail.

COMPRESSION NEUROPROCESSOR 4

Figures 2, 3:
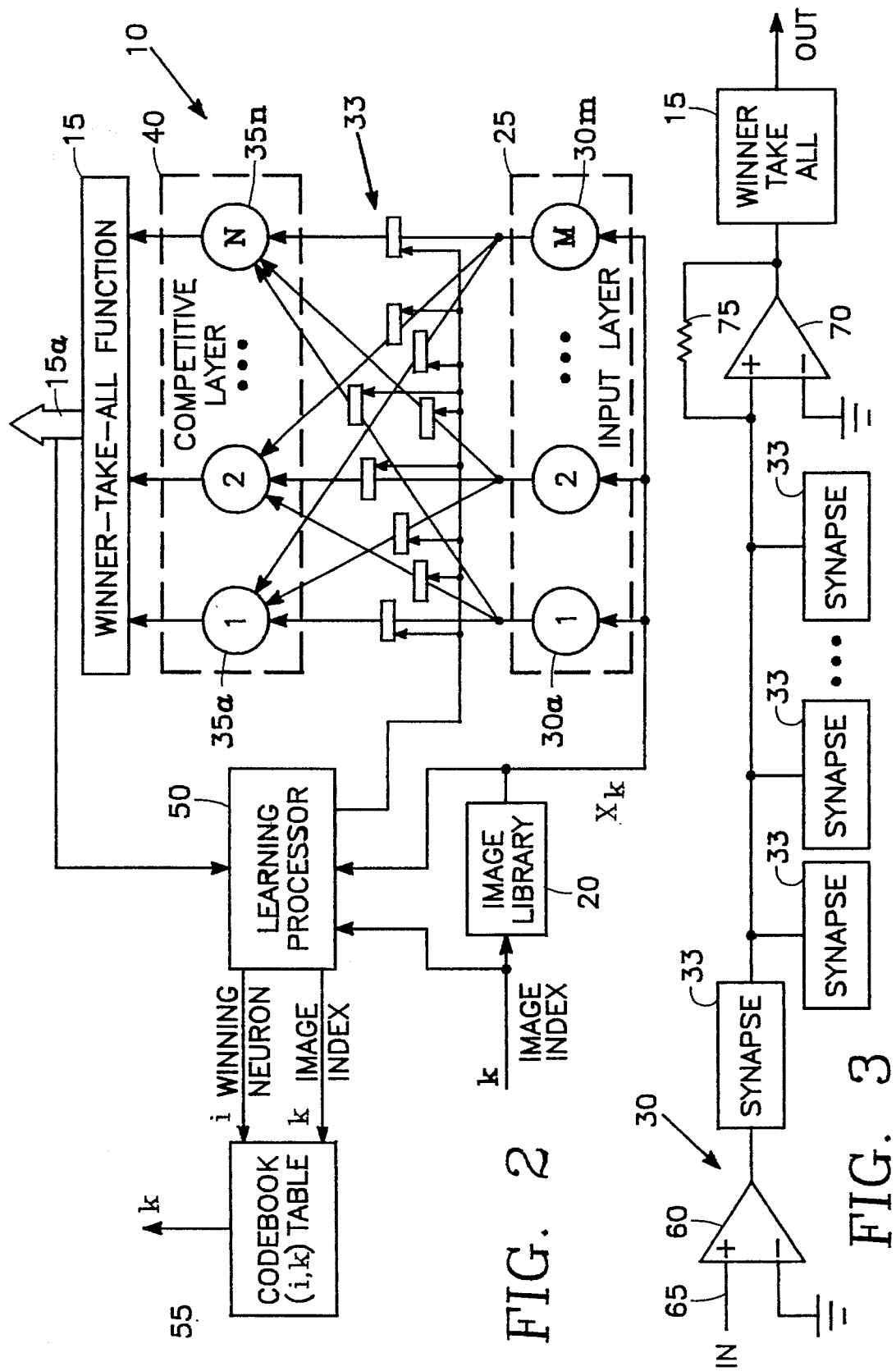
FIG. 2 is a schematic block diagram of a high-ratio lossy image compressor including a neural network having a winner-take-all function for training employed in the system of FIG. 1.
FIG. 3 is a schematic block diagram of a typical neuron of the neural network of FIG. 2.

The image compression neuroprocessor 4 of FIG. 1 is an image compression system disclosed in U.S. patent application Ser. No. 08/313,859 filed Sep. 26, 1994 by the present inventors entitled "DATA COMPRESSING NEURAL NETWORK WITH WINNER-TAKE-ALL FUNCTION" and assigned to the present assignee. In one embodiment, the image compression neuroprocessor 4 is a lossy image compressor. In another embodiment, the image compression neuroprocessor 4 combines a lossy image compressor having a high compression ratio with a lossless image compressor, in which the output of the lossy image compressor is compressed by the lossless compressor. In this latter embodiment, in order to compensate for the lossyness of the high ratio lossy image compressor, the error or difference between (a) the compressed image represented by the output of the lossy image compressor and (b) the original image is computed. This difference is itself compressed by another lossy compressor. The original image is thus represented by a compressed image (generated by the lossy compressor) and the compressed difference. The high-compression-ratio lossy compressor and the lossless compressor are now described separately. High Compression Ratio Lossy Image Compressor:

FIG. 2 illustrates the preferred embodiment of the lossy image compressor, which, in one embodiment, may constitute the entire image compression neuroprocessor 4 of FIG. 1. The lossy image compressor includes a neural network 10 with a winner-take-all circuit 15. A set of predetermined M-dimensional images or image vectors X(k) numbered in accordance with an image index k are stored in an image library 20 (preferably implemented as a random access memory). An input layer 25 of the neural network 10 consisting of M pass-through input nodes 30a–30n receives either a selected M-dimensional image from the image library 20 or an unknown M-dimensional image to be compressed. An M-by-N array of synaptic weights 33 connects each one of the M input nodes 30 with each one of N neurons 35a–35n in a competitive layer 40. The array 33 is an M-by-N dimensional matrix W of weight elements $W_{i,j}$. The competitive layer 40 includes the winner-take-all circuit 15. The winner-take-all circuit 15 has N inputs connected to the respective outputs of the N neurons 35 and an output 15a which identifies the index i of a single winning neuron 35 chosen in a manner to be described below. A learning processor 50 controls the training of the neural network 10 by updating the weights of the array of synaptic weights 33 in accordance with the index i output by the winner-take-all circuit 15, the image X(k) and the matrix W of weight elements $W_{i,j}$ in a manner to be described below. During training, as the learning processor selects a winning neuron i for a particular image X(k) in the library 20, the corresponding pair of indices i,k is stored in a table codebook 55. The codebook 55 is preferably implemented as a random access memory.

Referring to FIG. 3, each input node 30 in the input layer 25 consists of an input amplifier 60 and amplifier input 65. The output of the amplifier 60 is connected through a respective one of the synaptic weights 33 to the input of a neuron 35. Each neuron 35 consists of an amplifier 70, its input being a negative input terminal, as illustrated in FIG. 3 with a feedback resistor 75 connected between the negative input and amplifier output of the amplifier 70.

To begin training, the neural network 10 is turned on (powered up) and, without necessarily changing the synaptic weights 33 from whatever random (but stable) pattern of weight values they may happen to assume initially, a given training image X(k) is applied to the input layer. The learning processor 50 governs the training of the neural network by identifying the neuron 35 having the greatest output signal for a given training image X(k) selected from the library 20 and modifying the synaptic weights 33 ($W_{i,j}$) to magnify the winning margin of the winning neuron's output. This process is repeated for each one of the training images with which it is desired to train the neural network 10. During use, each incoming image is identified by the neural network 10 outputting a winning neuron index i, which is then translated to an image index k using the codebook memory 55. The index k is what is transmitted, rather than the image itself. Compression is achieved because the number of bits of data required to represent any one of the M-dimensional images X(k) is far greater than the number of bits representing the image index k.

Figure 4:
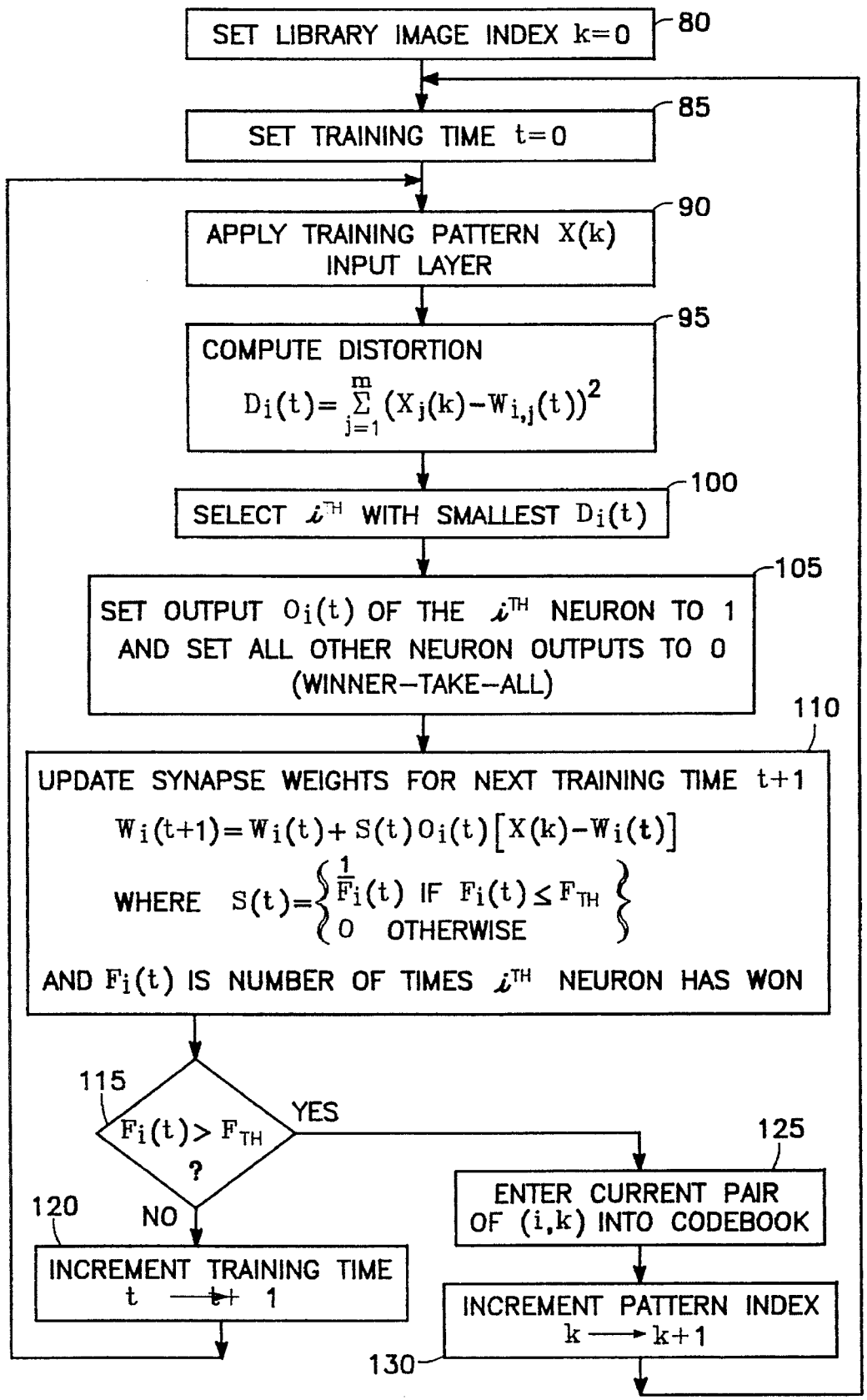
FIG. 4 is a flow diagram illustrating the winner-take-all training method for training the neural network of FIG. 2.

The training process performed by the learning processor 50 is illustrated in detail in FIG. 4. This process begins with the first image X(0) stored in the library 20 (by setting the library image index k=0 in block 80 of FIG. 4). Also, a training iteration time t is initialized to zero (block 85 of FIG. 4). The $k^{th}$ library image (where k=0 in this initial iteration) is applied to the input layer 25 (block 90 of FIG. 4). Then, for each one of the neurons 35, the learning processor 50 computes an error or difference between the M-dimensional image vector X(k) and the M-dimensional column of the M-by-N synapse matrix W connected to the one neuron. The neuron corresponding to the column of synapse matrix elements most closely resembling the image vector X(k) (i.e., having the smallest difference) is the winning neuron for this image. This difference is computed as follows:

$$D_i = \sum_j [X_j(k) - W_{i,j}(t)]^2$$

where i is the index of the $i^{th}$ neuron (block 95 of FIG. 4). The value of i associated with the smallest $D_i$ identifies the candidate neuron (block 100 of FIG. 4). The winner-take-all circuit 15 then sets the output of the winning neuron to 1 (or a maximum voltage representing a logic 1) and all other neuron outputs to zero (block 105 of FIG. 4).

Next, the learning processor 15 updates each one of the synaptic weight elements ($W_{i,j}$) 33 within the column of W associated with the winning neuron (i.e., all elements $W_{i,j}$ whose column index i equals the index i of the winning neuron) in accordance with the difference between that matrix element and the corresponding element of the image vector X(k). This operation is as follows:

$$W_{i,j}(t+1) = W_{i,j}(t) + S(t)[X(k)_j - W_{i,j}(t)]$$

where S(t) is the inverse of the number times $F_i(t)$ the $i^{th}$ neuron has won while the present library image X(k) has been applied to the input layer 25 (block 110 of FIG. 4). For this purpose, the learning processor 50 controls each synapse weight 33 individually using techniques well-known in the art. The training process for the library image X(k) is deemed to be completed as soon as $F_i(t)$ exceeds a predetermined threshold $F_{th}$ (YES branch of block 115 of FIG. 4). Otherwise (NO branch of block 115), the training time is incremented (block 120 of FIG. 4) and the process returns to block 90 to begin the next training cycle. If, however, $F_i(t)$ does exceed $F_{th}$, the index i of the winning neuron and the image index k of the currently applied library image X(k) are recorded as a pair in the codebook or table 55 (block 125 of FIG. 4), the library image index k is incremented (block 130) and the process reverts to the beginning step of block 85 to begin the training process for the next library image. The entire process is repeated until the neural network has been trained with all of the library images.

After training has been thus completed, during operation a succession of uncompressed image vectors in a data stream of such vectors are applied to the input layer 25, producing at the winner-take-all circuit output 15a a succession of neuron indices i, which are transmitted on a communication channel as compressed data representing the succession of uncompressed images. The compressed image data thus transmitted on the channel is de-compressed by a de-compressor which has the same codebook 55 and same image library 20 as the compressor of FIG. 2. Such a de-compressor is illustrated in FIG. 5 and corresponds to the image decompressor 5 of FIG. 1. Each neuron index i received through the channel is translated by a codebook 55' to an image index k, which addresses an image library 20' to retrieve the corresponding library image X(k) as the uncompressed image. The lossyness of the compressor of FIG. 2 is the difference between the actual uncompressed image received at the input layer 25 and the corresponding library image X(k). Such a lossy image compressor typically has a compression ratio of about twenty.

In an alternative embodiment, the compressor of FIG. 2 transmits the image index k corresponding to the winning neural index i by employing the codebook 55 during operation, which eliminates the need for the codebook 55' in the de-compressor of FIG. 5.

One advantage of the invention illustrated in FIG. 6 is that the neural network 10 automatically classifies a large set 140 of different images (e.g., thousands of images) into N different groups 145 of similar images, thus simplifying certain image compression problems, where N is the number of neurons 35. For this purpose the threshold number of selections $F_{th}$ governing the training process is selected to be about twice the number of possible images divided by the number N of image groups. Thus, for example, to compress a large set of synthetic radar images (e.g., 12,000 images) with a relatively small number of neurons (e.g., N=64), the threshold $F_{th}$ is about 400. In this example, the neural network can be trained to recognize 64 different training images and will associate each one of the 12,000 possible images with the most similar one of the training images. In this example, the 12,000 possible different images will be grouped by the neural network into 64 groups of, on the average, 200 similar images.

Another advantage of the compression neuroprocessor 4 of FIG. 2 is that it automatically adapts to changing image sets. For example, the set of library images with which the neural network 10 has been initially trained for one scenario may not apply necessarily to another scenario. If scenarios are changed, the neural network can be trained in real time to a new set of images by simply re-activating the training process of FIG. 4 as the new images are received and then modifying the image library 20 and the codebook 55 accordingly.

In such a case, the revisions to the library 20 must be provided to the de-compressor of FIG. 5. The most efficient way of accomplishing this is for the compressor to transmit only the difference between the new library image and the original library image which it is to replace. This is illustrated in FIG. 7, in which a high-ratio loss compressor 600 corresponding to the compressor of FIG. 2 has its output connected to a de-compressor 605 corresponding to the de-compressor of FIG. 5. The output of the de-compressor 605 is subtracted at a node 610 from the uncompressed image, and the difference is transmitted via the channel to the receiver/de-compressor 620. The receiver/de-compressor 620, corresponding to the de-compressor of FIG. 5, responds to the transmitted difference signal by adding it to the image in the library 20' corresponding to the current image index k.

In another aspect, the difference signal may be employed even in the absence of any change in scenario and revision of the image libraries 55, 55'. Instead, the difference signal provides a correction for the difference between a received uncompressed image and the most similar image stored in the image libraries 55, 55'. By transmitting the difference signal produced by the subtractor 610 of FIG. 7, the output of the de-compressor 620 is corrected with the difference signal to produce a more faithful uncompressed version of the original image. A summer 610' in the de-compressor adds the difference signal to the output of the lossy de-compressor 620 to produce the more faithful uncompressed version of the original image.

Compression System With Lossy Compressor and Lossless Compressor:

As mentioned above, the compression neuroprocessor 4 may either constitute the lossy compressor alone or, alternatively, may be a combination of the lossy image compressor with a lossless image compressor. This latter combination will now be described with reference to the foregoing description of the lossy image compressor. As illustrated in FIG. 7, the compressed image data (i.e., the neuron index i and the difference signal) are compressed in lossless compressors 640, 650, respectively, in the compression system of FIG. 7. Then, in the de-compression system of FIG. 7, lossless de-compressors 660, 670 de-compress the neuron index i and the difference signal, respectively. Such lossless de-compressors are preferably of the type employing the Rice algorithm referenced herein above. For this purpose, a conventional communication processor 680 multiplexes the outputs of the two lossless compressors 640, 650 into a single data stream for transmission via a conventional modulator 681 on a channel (or storage device) 682 for receipt (or retrieval) through a conventional demodulator 683. A conventional communication processor 684 demultiplexes the data stream into its two components, image data and difference data, and routes them to the lossless de-compressors 660 and 670, respectively. Bypass switches 685, 686 permit the image data from the lossy compressor 600 to bypass the lossless compressor 640 and the lossless de-compressor by routing the image signal along respective bypass paths 687, 688. A further option is for the communication processors 680, 684 to suppress the difference signal from the lossless compressor 650, if desired.

Figure 10:
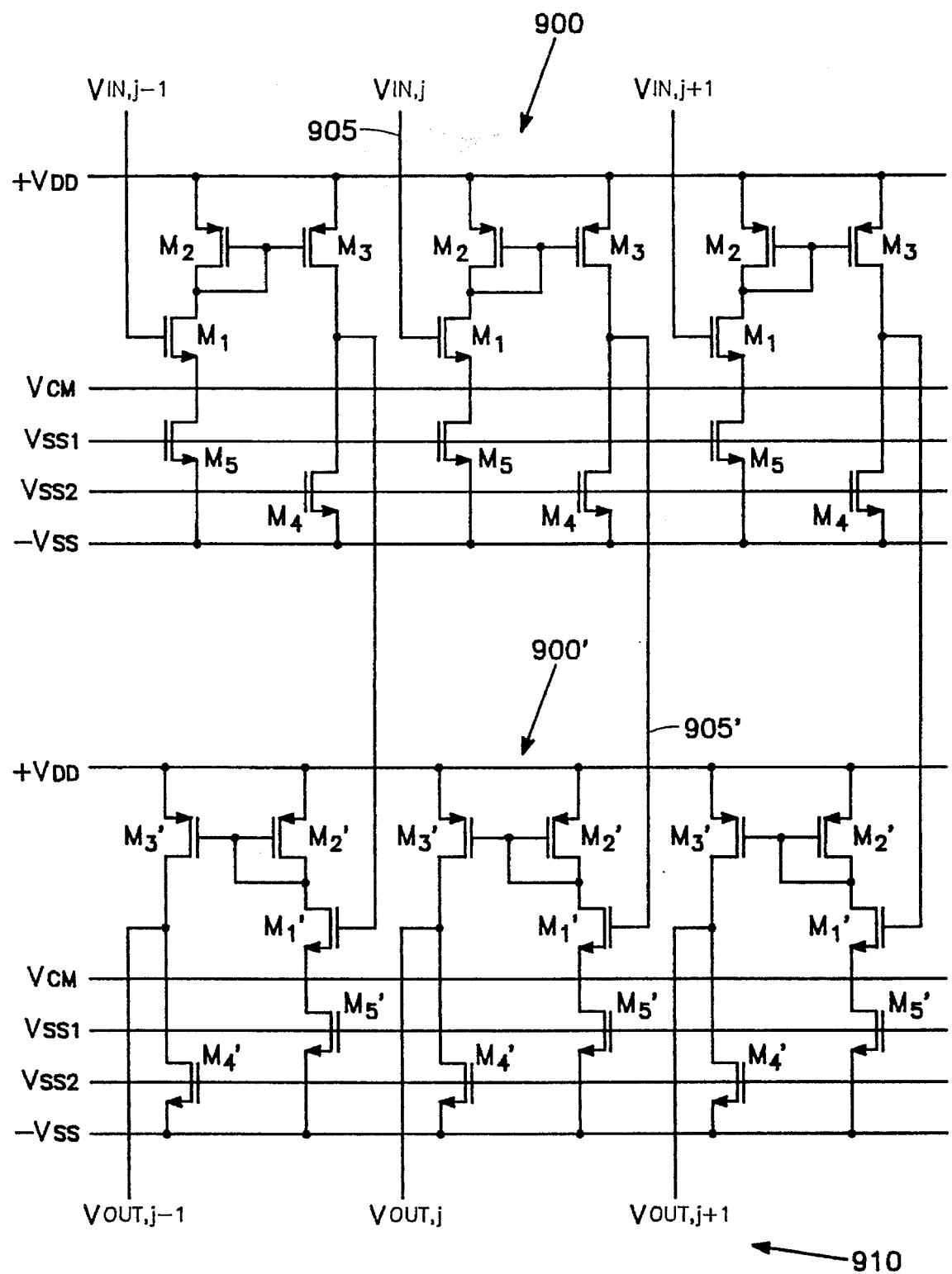
FIG. 10 is a schematic diagram of a winner-take-all 5 circuit employed in the lossy compressor of FIG. 2.

Lossless Image Compressor:

One implementation of the lossless compressor 640 (and 650) is illustrated in FIG. 8, in which the incoming data is processed by a differencing element 700 which computes the differences between successive images (in the present case, the differences between successive neuron indices i). The resulting differences are signed integers which are mapped by a mapper 710 to unsigned integers. The data stream of unsigned integers is then encoded by a number of different entropy encoders 715, and an optimum code selector 720 chooses the output of only one of the encoders 715 for transmitting as compressed data along with a code I.D. identifying the chosen code. The choice of entropy code is dictated by the statistics of the particular block of data. Specifically, the optimum code selector first determines the code length corresponding to the particular data block and then chooses a particular entropy code optimum for that length, as described in the publication by Rice referenced herein above. One implementation of the lossless de-compressor 660 (and 670) is illustrated in FIG. 9, in which the incoming data is decoded by a corresponding set of entropy decoders 730. A code selector 735 selects the output of only one of the entropy decoders 730 in accordance with the transmitted code I.D. The decode data is mapped to signed integers by an inverse mapper 740, completing the de-compression process. Winner-Take-All Circuit For the Lossy Compressor:

A winner-take-all circuit which may be employed as the winner-take-all circuit 15 of FIG. 2 is disclosed by Wai Chi Fang, *VLSI Image Compression*, Ph.D. Dissertation, University of Southern California, Los Angeles, Calif. FIG. 10 illustrates a suitable design of the winner-take-all circuit 15 of FIG. 2. The winner-take-all circuit of FIG. 10 consists of plural identical cells 900a–900n, the number of cells 900 being equal to the number of neurons 35 in the competitive layer 40 of FIG. 2. Each cell 900i has an input line 905i connected to the output of the respective neuron 35i. Within each cell 900, an N-channel input metal oxide semiconductor field effect transistor (MOSFET) M1 has its gate connected to the input line 905, its drain connected to the source and gate of a bias P-channel MOSFET M2 and its source connected to a common voltage line VCM shared among all cells 900. The drain of the bias MOSFET M2 is connected to a drain voltage line VDD. A P-channel current mirror MOSFET M3 has its gate connected to the gate of the bias MOSFET M2, its drain connected to the drain voltage line VDD and its source connected to an output line 910. An N-channel current bias MOS has its source connected to a source voltage line VSS, its drain connected to the common voltage line VCM and its gate connected to a first bias voltage line VBB1. A second N-channel current bias MOSFET has its source connected to the source voltage line VSS, its drain connected to the output node 910 and its gate connected to a second bias voltage line VBB2.

The array of cells 900 responds to a set of N simultaneous but at least slightly different input voltages $V_i$ from the N neuron outputs by pushing the output node 910 of the cell 900i having the greatest input voltage toward the positive voltage of the drain voltage line VDD while pushing the output node of each remaining cell toward the source voltage line VSS. The array accomplishes this result as follows. As the input voltage $V_i$ to a particular cell 900i increases, the voltage drop across the cell's input MOSFET M1 increases, driving up the gate voltage of the current mirror MOSFET M3. This in turn increases the voltage of the cell's output 910. Assuming the adjacent cell 900j receives a smaller input voltage $V_j$, input MOSFET M1 of the adjacent cell 900j has a smaller voltage drop and therefore more of the current from the common voltage line VCM flows through the input MOSFET M1 of the adjacent cell 900j drive downward the gate voltage of the current mirror transistor M3 of that cell, cutting off M3. In contrast, in the particular cell 900i, less of the current from the common voltage line VCM flows through the input MOSFET M1, so that the current mirror MOSFET in that cell is not cut off. The common voltage line VCM provides a normalization among all cells, guaranteeing that the only cell having a positive voltage on its output node 910 is the one cell receiving the greatest input voltage $V_i$. In the preferred design, each cell 900 is cascaded with an identical output cell 900', so that there are two cascaded arrays of cells, an input array of cells 900a–900n and an output array of cells 900a'–900n'. Each output cell 900' has the same elements as the input cell 900, including an input node 905', MOSFETs M1, M2, M3, M4 and an output node 910'. The cascade arrangement provides enhanced performance. The restriction of the possible voltages of the output node 910 to either VDD or VSS provides a binary output.

The following table provides the preferred geometry of each of the MOSFETs, the first number being the length in micrometers of the MOSFET drain and the second number being the length in micrometers of the MOSFET gate.

TABLE I

| MOSFET | M1 | M2 | M3 | M4 | M5 |
|---|---|---|---|---|---|
| Sizes | 8/2 | 8/4 | 16/4 | 8/4 | 16/4 |

MOTION ESTIMATION NEUROPROCESSOR 9

Figure 12:
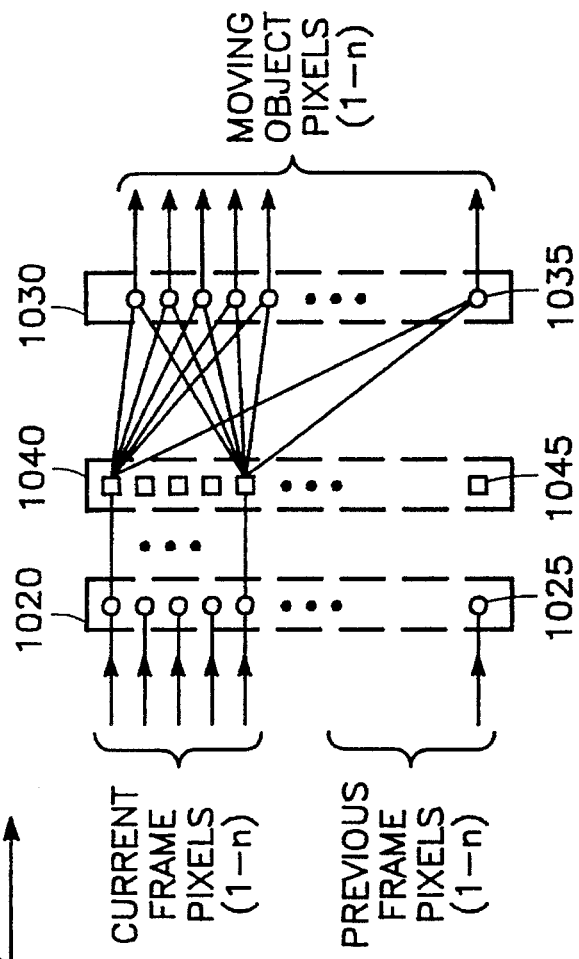
FIG. 12 is a block diagram of a neural network in the neuroprocessor of FIG. 11.
Figure 11:
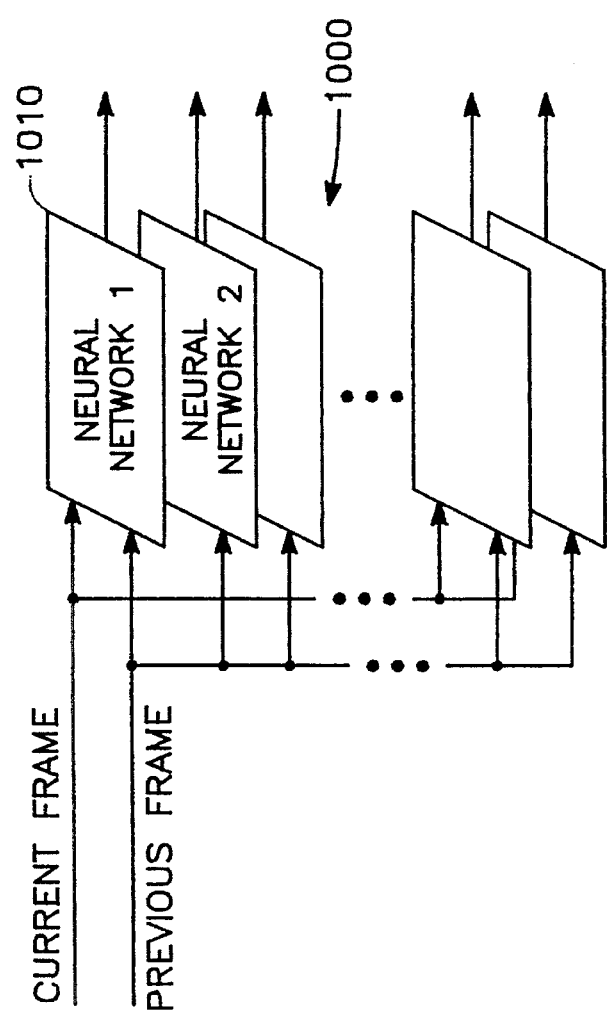
FIG. 11 is a block diagram of a motion estimation neuroprocessor employed in the system of FIG. 1.

Referring now to FIG. 11, the motion estimation neuroprocessor 9 is a stack 1000 of individual conventional neural networks 1010. Referring to FIG. 12, each individual neural network 1010 consists of an input layer 1020 of input neurons 1025, an output layer 1030 of output neurons 1035 and a connection layer 1040 of adjustably weighted synapses 1045 connecting each input neuron 1025 with each output neuron 1035. The weights of the individual synapses 1045 are adjusted simultaneously in a training process to be described below herein. The number of neurons 1025 in the input layer 1020 is sufficient so that all individual pixels of two successive video frames of a predetermined size may be applied simultaneously to respective individual ones of the input neurons 1025. The number of neurons 1035 in the output layer 1035 is sufficient so that each output neuron 1035 represents one individual pixel of a single video frame.

The neural networks 1010 of the motion estimation neuroprocessor 9 are trained so that each individual neural network 1010 responds, whenever the two successive video frames applied to the input layer 1020 contain a moving object of a particular direction and velocity assigned to that particular neural network 1010, by identifying only those pixels actually containing the moving object's image in both of the two successive video frames. Each one of a complete set of velocities/directions is assigned to a respective one of the neural networks 1010 in the stack 1000, the number of neural networks 1010 being sufficient to represent the complete set of velocities.

Figure 13:
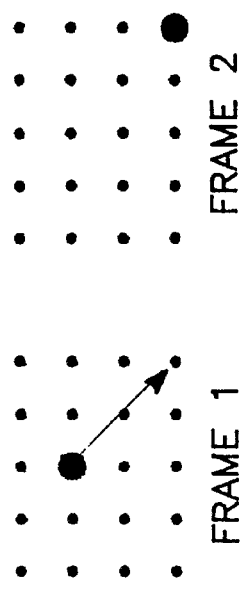
FIG. 13 is a diagram illustrating measurement of velocity of a moving object between two video frames.

For each one of the individual neural networks 1010, the training process can consist of applying to the input layer 1020 two successive video frames containing in their images a single-pixel moving object having a known constant direction and velocity equal to the velocity assigned to the particular neural network 1010 being trained, the object starting at a particular pixel location in the first frame and ending at a another particular pixel location in the second frame, as illustrated in FIG. 13. The target vector is defined as a state in which only those output neurons 1035a, 1035b corresponding to the starting and ending positions of the single-pixel moving object, and all neurons in between, are "on" all other output neurons 1035 being "off". The training process is performed in accordance with conventional techniques in which the "training vector" is applied repeatedly in successive cycles, the weights of the synapses 1045 being incrementally updated in each cycle until the neural network 1010 performs correctly to within a predetermined tolerance. The process is repeated for each possible starting position of the single-pixel moving object, until the neural network 1010 responds correctly to a moving object of the assigned velocity at any starting position in the image. The same training process is carried out separately for each one of the neural networks 1010, the velocity of the single-pixel moving object being the unique velocity assigned to the individual neural network 1010.

In the preferred embodiment of the invention, for each velocity magnitude, a different neural network 1010 is trained to respond to only one of the various possible different directions, so that the number of neural networks 1010 in the stack 1000 is the number of all possible velocities and directions of a single pixel moving object. The number is determined by the range of possible velocities in the image. Each velocity is the number of pixels travelled by the single pixel moving object between the two successive frames and the direction. Assuming that objects moving more half-way across the entire image within the time span of the two successive video frames are to be ignored, the number of velocities magnitudes is half the number of pixels spanning the image multiplied. The number of velocities is the sum of the number of possible directions for each velocity magnitude over all velocity magnitudes. The number of possible directions for each velocity magnitude is the twice the velocity magnitude (measured in number of pixels travelled between two successive video frames) multiplied by pi (i.e., about 3.1416) rounded off to the least whole number. Thus, the number of neural networks is the sum over n of 2(3.1416)n, from n=1 to n=half the image width in pixels.

However, in an alternative embodiment, each neural network 1010 is trained to respond to all possible directions of movement of the single-pixel moving object for a single velocity magnitude assigned to that neural network 1010, thereby reducing the number of neural networks 1010 to only half the number of pixels spanned by the image. In yet another possible embodiment, a single very robust neural network is trained to respond correctly for all possible combinations of velocity magnitudes and directions of a single pixel moving object. Such a robust neural network would have many layers of neurons and many layers of synapses, for example.

MOTION-COMPENSATED PREDICTOR 8

Figure 14:
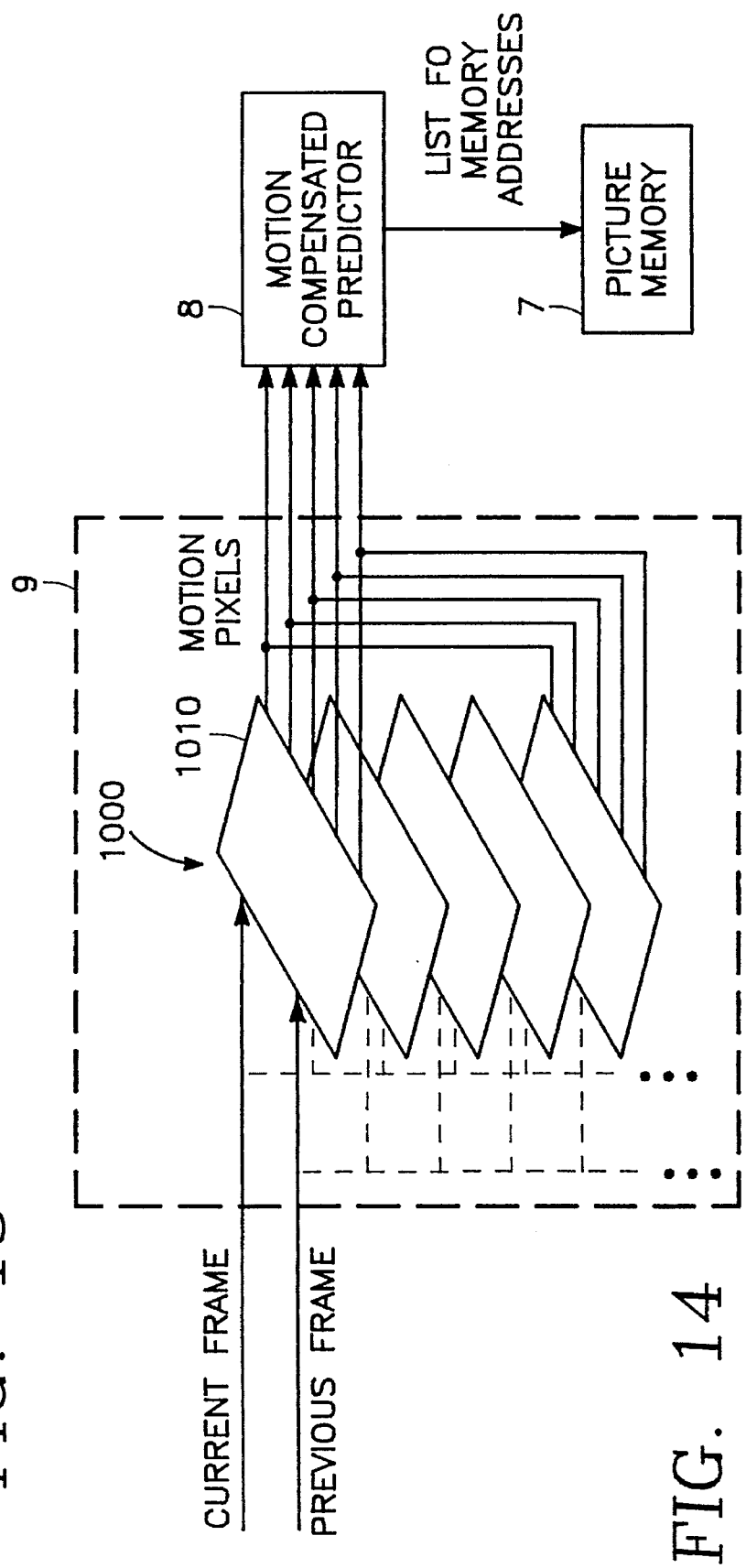
FIG. 14 is a block diagram of the motion estimation neuroprocessor of FIG. 11, a motion-compensated predictor and a picture memory in the system of FIG. 1.

Referring to FIG. 14, the motion-compensated predictor 8 has an input for each pixel in one video image. As described above, there is one output neuron in each neural network 1010 for each pixel in one video image. The output neurons 1035 of every neural network 1010 are connected to corresponding ones of the inputs of the motion-compensated predictor 8. The motion compensated predictor 8 converts a logic "high" at each one of its inputs (corresponding to a particular pixel location) to the location address of the corresponding pixel in the picture memory 7'. The motion-compensated predictor 8 transmits this address to the picture memory 7 so that the corresponding pixel is retrieved from the picture memory 7. Many such addresses are thus transmitted whenever many pixels represent a moving object in the current video frame, causing an image to be retrieved from the picture memory 7. Simultaneously, these addresses are also transmitted on the channel along with the compressed difference image from the compression neuroprocessor 3, as described above. The motion-compensated predictor 8 is thus an address generator which is programmed to provide a unique memory address of the picture memory 7 in response to a logic "high" at the output of a corresponding output neuron 1025. Thus, in one embodiment, the motion-compensated predictor 8 is implemented as a programmed microprocessor having analog inputs connected to respective output neurons 1025.

While the invention has been described in detail by specific reference to preferred embodiments thereof, it is understood that variations and modifications thereof may be made without departing from the true spirit and scope of the invention.

What is claimed is:

1. An image data system comprising:

a compression system, comprising:

an image compressor;

an image decompressor correlative to said image compressor having an input connected to an output of said image compressor;

a feedback summing node having one input connected to an output of said image decompressor;

a picture memory having an input connected to an output of said feedback summing node;

means for comparing an image stored in said picture memory with a received input image and deducing therefrom pixels having differences between said stored image and said received image and for retrieving from said picture memory a partial image comprising said pixels only and applying said partial image to another input of said feedback summing node, whereby to produce at the output of said feedback summing node an updated decompressed image;

a subtraction node having one input connected to received said received image and another input connected to receive said partial image so as to generate a difference image, said image compressor having an input connected to receive said difference image whereby to produce a compressed difference image at the output of said image compressor.

2. The image system of Claim 1 further comprising:

an image decompression system remotely linked to said image compression system by a channel, comprising:

a remote image decompressor correlative to said image compressor having an input linked via said channel to said output of said image compressor;

a remote feedback summing node having one input connected to an output of said image decompressor;

a remote picture memory having an input connected to an output of said feedback summing node;

said remote picture memory being responsive via said channel to said means for comparing an image whereby said means for comparing an image comprises means for retrieving from said remote picture memory a remote partial image comprising said pixels only and applying said remote partial image to another input of said remote feedback summing node, whereby to produce at the output of said remote feedback summing node an updated decompressed image.

3. The image system of claim 1 further comprising means for extracting from said input image for input to said subtraction node only those pixels of said input image corresponding to said pixels deduced by said means for comparing as corresponding to moving objects, whereby said subtraction node receives only pixels corresponding to those retrieved from said picture memory.

4. The image system of claim 1 wherein said means for comparing comprise:

neural network means trained to deduce from successive image pairs pixels corresponding to moving objects; and means responsive to said neural network means for retrieving data from said picture memory corresponding to said pixels of said moving objects.

5. The image system of claim 4 wherein said neural network means comprise a stack of individual velocity-sensing neural networks having identical input layers connected to receive said successive image pairs and identical output layers of output neurons corresponding to one image stored in said picture memory, each of said individual velocity-sensing neural networks being trained to identify moving object pixels of respective velocities, said stack of velocity-sensing neural networks representative of a complete set of moving object velocities.

6. The system of claim 1 wherein said image compressor comprises:

a first memory for storing said set of predetermined images;

a compression neural network having an input layer and an output layer, said compression neural network having a plurality of possible states and being trained to produce a respective one of said states at said output layer for a respective one of said predetermined images received at said input layer;

a winner-take-all circuit connected to outputs of said output layer of said compression neural network for selecting a winning one of said states of said neural network from all possible states of said compression neural network, wherein said first compressed image data corresponds to said winning state.

7. The system of claim 6 wherein each of said predetermined images is stored in said first memory in accordance with a respective image index, said system further comprising:

a codebook for correlating a respective image index with a corresponding winning state of said compression neural network, and wherein said first image data comprises data identifying said winning state.

8. The system of claim 2 wherein said image compressor comprises:

a first memory for storing said set of predetermined images;

a compression neural network having an input layer and an output layer, said compression neural network having a plurality of possible states and being trained to produce a respective one of said states at said output layer for a respective one of said predetermined images received at said input layer;

a winner-take-all circuit connected to outputs of said output layer for selecting a winning one of said states of said compression neural network from all possible states of said neural network, wherein said first compressed image data corresponds to said winning state.

9. The system of claim 8 wherein each of said predetermined images is stored in said first memory in accordance with a respective image index, said system further comprising:

a codebook for correlating a respective image index with a corresponding winning state of said compression neural network, and wherein said first image data comprises data identifying said winning state.

10. The system of claim 9 wherein said image decompressor comprises:

a second memory for storing said set of predetermined images and for providing one of said predetermined images specified by said first compressed image data.

11. The system of claim 10 wherein said first compressed image data comprises data identifying said winning state, said second memory stores said predetermined images in accordance with corresponding image indices, said image decompressor further comprising:

a codebook correlating each one of said states of said compression neural network with a corresponding one of said image indices, whereby an image index corresponding to said winning state addresses said second memory to retrieve the corresponding predetermined image.

12. The system of claim 11 wherein said first memory is updated by replacing the predetermined image corresponding to said winning state with said original image, whereby said image compressor is adaptive to images from new scenes.

13. The system of claim 11 wherein said first memory is updated by replacing the predetermined image corresponding to said winning state with said original image, and said second memory is updated by adding said difference to the corresponding predetermined image in said second memory.

14. The system of claim 13 wherein said input and output layers of said image compressor are linked by an array of compressor synapses, said system further including a learning processor comprising:

means responsive to identification of said winning state by said winner-take-all circuit for updating compressor synapses associated with said winning state in accordance with the corresponding one of said predetermined images applied to said input layer during a training exercise;

means for storing the image index of the predetermined image applied to said input layer during a training exercise and an index identifying the corresponding winning state as a codebook entry.

15. The system of claim 1 wherein said image compressor comprises:

a lossy image compressor having an image compression ratio in excess of 10 for producing first compressed image data from an original image, said first compressed image data specifying a corresponding one of a set of predetermined images;

means for computing an difference between said original image and said predetermined image specified by said first compressed image data;

a lossless image compressor for compressing at least said difference to produce second compressed image data; and means for transmitting said first and second compressed image data.

16. The system of claim 15 further comprising:

a lossless image de-compressor for receiving said second compressed image data and producing therefrom said difference;

a lossy image de-compressor for receiving said first compressed image data and producing therefrom said one predetermined image specified by said first compressed image data; and means for adding said difference to said one predetermined image to produce a reproduction of said original image.

17. The system of claim 15 wherein said lossy compressor comprises:

a first memory for storing said set of predetermined images;

a neural network having an input layer and an output layer, said neural network having a plurality of possible states and being trained to produce a respective one of said states at said output layer for a respective one of said predetermined images received at said input layer;

a winner-take-all circuit connected to outputs of said output layer for selecting a winning one of said states of said neural network from all possible states of said neural network, wherein said first compressed image data corresponds to said winning state.

18. The system of claim 17 wherein each of said predetermined images is stored in said first memory in accordance with a respective image index, said system further comprising:

a codebook for correlating a respective image index with a corresponding winning state of said neural network, and wherein said first image data comprises data identifying said winning state.

19. The system of claim 15 further comprising a lossy compressor for compressing said first image data.

20. The system of claim 16 wherein said lossy compressor comprises:

means for storing said set of predetermined images;

a neural network having an input layer and an output layer, said neural network having a plurality of possible states and being trained to produce a respective one of said states at said output layer for a respective one of said predetermined images received at said input layer;

a winner-take-all circuit connected to outputs of said output layer for selecting a winning one of said states of said neural network from all possible states of said neural network, wherein said first compressed image data corresponds to said winning state.

21. The system of claim 20 wherein each of said predetermined images is stored in said means for storing in accordance with a respective image index, said system further comprising:

a codebook for correlating a respective image index with a corresponding winning state of said neural network, and wherein said first image data comprises data identifying said winning state.

22. The system of claim 21 wherein said lossy de-compressor comprises:

a second memory for storing said set of predetermined images and for providing one of said predetermined images specified by said first compressed image data.

23. The system of claim 22 wherein said first compressed image data comprises data identifying said winning state, said second memory stores said predetermined images in accordance with corresponding image indices, said lossy de-compressor further comprising:

a codebook correlating each one of said states of said neural network with a corresponding one of said image indices, whereby an image index corresponding to said winning state addresses said second memory to retrieve the corresponding predetermined image.

24. The system of claim 16 wherein said lossless compressor comprises:

plural entropy encoders each employing a different entropy code;

an optimum code selector for computing a code length of successive blocks said second image data and choosing for each said block one of said plural entropy encoders whose code is optimum for the code length of that block; and means for generating data identifying the code chosen by said optimum code selector for transmission with said second compressed image data.

25. The system of claim 24 wherein said lossless decompressor comprises:

plural entropy decoders; and means responsive to said data identifying the code chosen by said optimum code selector of said lossless compressor for choosing a corresponding one of said plural entropy decoders to decode said second image data.

26. The system of claim 17 wherein said first memory is updated by replacing the predetermined image corresponding to said winning state with said original image, whereby said lossy compressor is adaptive to images from new scenes.

27. The system of claim 22 wherein said first memory is updated by replacing the predetermined image corresponding to said winning state with said original image, and said second memory is updated by adding said difference to the corresponding predetermined image in said second memory.

28. The system of claim 27 wherein said input and output layers are linked by an array of synapses, said system further including a learning processor comprising:

means responsive to identification of said winning state by said winner-take-all circuit for updating synapses associated with said winning state in accordance with the corresponding one of said predetermined images applied to said input layer during a training exercise;

means for storing the image index of the predetermined image applied to said input layer during a training exercise and an index identifying the corresponding winning state as a codebook entry.

* * * * *